Oct. 28, 1952     A. X. JOHNSON     2,615,722
CONVERTIBLE SCOOTER

Filed Oct. 18, 1949     2 SHEETS—SHEET 1

INVENTOR
ANDREW X. JOHNSON,

BY McMorrow, Berman & Davidson
ATTORNEYS

Oct. 28, 1952 A. X. JOHNSON 2,615,722
CONVERTIBLE SCOOTER
Filed Oct. 18, 1949 2 SHEETS—SHEET 2

INVENTOR
ANDREW X. JOHNSON,

BY
*McMorrow, Berman + Davidson*
ATTORNEYS

Patented Oct. 28, 1952

2,615,722

UNITED STATES PATENT OFFICE 2,615,722

CONVERTIBLE SCOOTER

Andrew X. Johnson, Milaca, Minn.

Application October 18, 1949, Serial No. 122,070

2 Claims. (Cl. 280—7.14)

This invention relates to an improved child's scooter or coaster having interchangeable wheels and runners, the primary object of the invention being to provide a more attractive and more serviceable device of this kind having novel construction, making it more easily and quickly convertible for use as a wheeled vehicle, or as a runner-equipped vehicle.

Another important object of the invention is to provide a scooter or coaster of the character indicated above of the three-wheel or three-runner type having a frame including a flexible portion upon which the rider supports himself with one knee while propelling the device with the other leg in contact with the ground, the part of the frame having the flexible portion being laterally offset.

Other important objects and advantages of the invention will be apparent from the following description and the accompanying drawings, wherein, merely for purposes of illustration herein, specific embodiments of the invention are set forth in detail.

In the drawings:

Figure 1 is a top plan view showing the device converted for use on ice and snow;

Figure 2 is a left-hand side elevation thereof;

Figure 3 is an enlarged fragmentary vertical transverse section taken on the line 3—3 of Figure 2;

Figure 5:
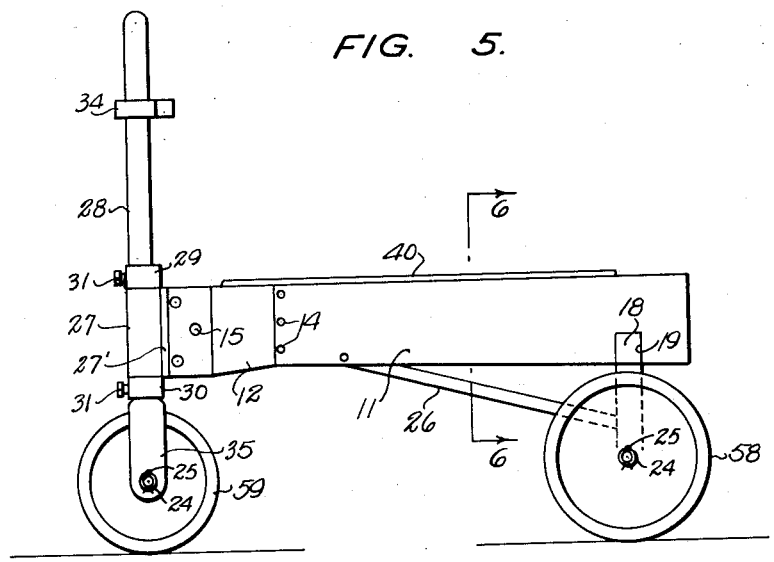
Figure 5 is a left-hand side elevation showing the device converted for use on dry pavement.

Referring in detail to the drawings, wherein like numerals designate like parts throughout the several views, the illustrated devices have in common a frame comprising a straight side member 9, extending the full length of the frame, a forwardly and inwardly-directed opposite side member 10 consisting of a main, slightly-angulated portion 11 having its rear end transversely aligned with the rear end of the other side member 9, and a shorter and more-sharply angulated portion 12 proceeding from the front end of the portion 11 and meeting the adjacent side of the other side member 9 at the front 13 and extending forwardly therealong to the front end thereof.

The portions 11 and 12 can be bolted or riveted together where they meet, as indicated at 14, and other bolts or rivets 15 join the forward end of the portion 12 with the other side member 9. The side members 9 and 11 are preferably of wood.

Figure 4:
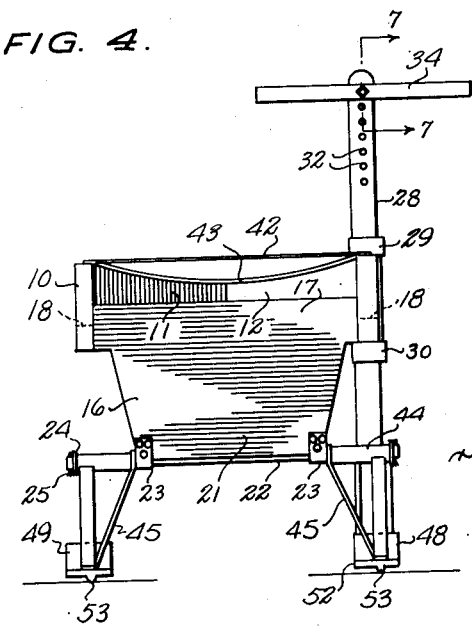
Figure 4 is a rear end elevation.
Figure 7:
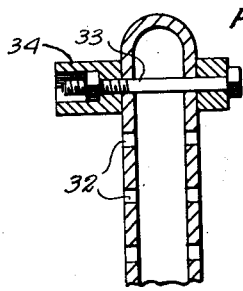
Figure 7 is an enlarged fragmentary transverse vertical section taken on the line 7—7 of Figure 4.

The rear portions of the side members 9 and 11 are spaced and connected by a depending bolster 16 having a transversely-elongated upper portion 17 secured to and between the inner sides of the side members at a level spaced below the upper edges thereof, as indicated in Figure 4, the portion 17 having downwardly-offset terminals 18 fitting in notches 19 cut in the lower edges of the side members, with bolts or screws 20 passing upwardly through the terminals 18 into the side members. The bolster 16 further comprises the downwardly-tapered portion 21 which depends a substantial distance below the side members and has set into its lower edge an axle 22 held in place by U-straps or the like 23, and whose ends extend laterally beyond the side edges of the bolster, as also shown in Figure 4. The outer ends of the axle 22 are equipped with washers 24 and removable cotter pins 25. A diagonal brace 26 extends forwardly and upwardly from the depending bolster portion 21 to the forward part of the frame.

On the forward end of the frame in line with the side member 9 is a vertical tube 27 having a flange 27' inserted between the side member 9 and the portion 12 of the side member 10 and secured in place by the above-mentioned bolts or rivets 15, the upper end of the tube 27 being on a level with the upper edges of the side members.

Journaled in the tube 27 is the tubular steering post 28 having thereon upper and lower collars 29 and 30, respectively, having set screws 31 therein. The lower collar 30 can be more or less permanently held in place on the post 28 by its set screw 31. The upper collar 29 is designed to be easily removable by loosening the set screw 31 so that the post is readily removable when desired.

The steering post 28 is formed with vertically-spaced holes 32 therethrough to selectively accommodate a bolt 33 traversing a handle bar 34, whereby the handle bar 34 can be secured at a desired height on the steering post.

The lower end of the steering post terminates in a fork 35 whose lower end is traversed by a bolt 36, with a spacer 37 on the bolt between the fork arms or legs 38, 38, as shown in Figure 3.

Figure 6:
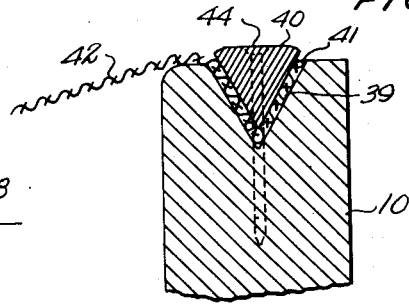
Figure 6 is an enlarged fragmentary vertical transverse section taken on the line 6—6 of Figure 5.

The frame side members 9 and 10 have continuous V-shaped grooves 39 formed therein, with which V-shaped retaining bars 40 cooperate, as shown in Figure 6, to retain in the grooves edge portions 41 of a flexible canvas knee rest 42 which is suspended from and between the frame side members, with only enough slack to provide conformance thereof with the knee and adjacent leg portions of the rider. The rear edge 43 of the rest 42 is free and unconnected with the frame. Screws 44 traverse the retainer bars 40 and the edge portions 41 of the rest 42 and enter the bottoms of the grooves 39 to hold the rest in place.

As shown in Figure 4, the ends of the axle 22 have hingedly journaled thereon the tubes 44 which are removably held thereon by the washers 24 and cotter pins 25. The tubes 44 have secured to their inward ends downwardly and outwardly-angulated brace rods 45. The outward ends of the tube 44 have secured thereto downwardly and forwardly and rearwardly-angulated brace rods 46 and 47, respectively. The lower ends of the brace rods are secured in any suitable manner to a main rear runner 48 and a rear outrider runner 49. These runners are similar in construction, except that the outrider runner 49 is substantially shorter than the main runner 48. Each runner consists of a preferably wooden runner body 50 having an upturned forward end 51, the bottoms of the bodies 50 being shoed with metal plates 52 having centered narrow ribs 53 on the under sides thereof.

A front runner 54 consists of a runner plate 55 having an upturned forward end 56 and vertical side plates 57 secured to rise from the side edges of the runner plate 55, as shown in Figure 3, to engage opposite sides of the steering post fork 35. The bolt 36 is extended through the side plates 57 to rotatably connect or hingedly mount the front runner 54 on the steering post 28 at a point intermediate the ends of the runners.

As shown in Figure 5, the main and outrider runners 48 and 49, respectively, can be replaced by wheels 58 slipped on the ends of the axle 22 and held in place by the washers 24 and cotter pins 25. The front runner 54 is likewise replaced by a wheel 59 which is disposed on the bolt 36 between the legs 38 of the steering post fork 35. In this replacement the collars 29 and 30 are shifted on the steering post 28 and the steering post elevated with respect to the remainder of the frame, as shown in Figure 5, to accommodate the greater vertical dimension of the front wheel 59.

It will be observed that all runner braces are rigid and integral in the runner structures so that no adjustment or assembling thereof is required in installing or removing the runners. These runners can with equal facility be used on other scooters or coasters by installing them on their axles to convert them for use on ice or snow.

What is claimed is:

1. In a scooter, an upstanding first straight side member, an upstanding second side member arranged in longitudinal spaced relation and at an angle with respect to said first named side member, said second side member having a portion on the forward end extending at an angle with respect thereto and secured to the straight side member inwardly of and adjacent the forward end of the last named member, an upstanding bolster arranged transversely of and between the first and second side members adjacent the rearward ends of the latter members and having the upper ends spaced below the upper ends of said first and second side members and secured thereto, a flexible sheet stretched between and secured to said first and second side members and forming a knee rest, the lower end of said bolster extending below and spaced from the lower ends of said first and second side members, an axle arranged adjacent to and in parallel relation with respect to the lower end of said bolster and carried by the lower end of said bolster, each of the ends of said axle projecting beyond the adjacent side edge of said bolster, a ground traversing element arranged longitudinally of said first and second members adjacent each of the projecting ends of said axle and supported on the adjacent projecting end of said axle, a vertically disposed tube arranged at and fixedly secured to the forward end of said first named side member, a steering post journaled in said tube and having the lower end below and spaced from said first named side member and having the upper end above and spaced from said first named side member, means carried by said steering post and engageable with the top and bottom of said first named side member for holding said post within said tube, a fork on the lower end of said steering post, another ground traversing element arranged longitudinally of said first and second named side members adjacent said fork of said steering post and rotatably connected to said fork, and a handlebar detachably secured to said steering post adjacent the upper end thereof.

2. In a scooter, an upstanding first straight side member, an upstanding second side member arranged in longitudinal spaced relation and at an angle with respect to said first named side member, said second side member having a portion on the forward end extending at an angle with respect thereto and secured to the straight side member inwardly of and adjacent the forward end of the last named member, an upstanding bolster arranged transversely of and between the first and second side members adjacent the rearward ends of the latter members and having the upper ends spaced below the upper ends of said first and second side members and secured thereto, a flexible sheet stretched between and secured to said first and second side members and forming a knee rest, the lower end of said bolster extending below and spaced from the lower ends of said first and second side members, an axle arranged adjacent to and in parallel relation with respect to the lower end of said bolster and carried by the lower end of said bolster, each of the ends of said axle projecting beyond the adjacent side edge of said bolster, a ground traversing element arranged longitudinally of said first and second members adjacent each of the projecting ends of said axle and supported on the adjacent projecting end of said axle, a vertically disposed tube arranged at and fixedly secured to the forward end of said first named side member, a steering post journaled in said tube and having the lower end below and spaced from said first named side member and having the upper end above and spaced from said first named side member, spaced collars carried by said steering post and engageable with the top and bottom of said first named side member for holding said post within said tube, a fork on the lower end of said steering post, another ground traversing element arranged longitudinally of said first and second named side members adjacent said fork of said steering post and rotatably connected to said fork, and a handlebar detachably secured to said steering post adjacent the upper end thereof.

ANDREW X. JOHNSON.

REFERENCES CITED

The following references are of record in the file of this patent:

UNITED STATES PATENTS

| Number | Name | Date |
| --- | --- | --- |
| 1,094,777 | Buckland | Apr. 28, 1914 |
| 1,209,398 | Converse | Dec. 19, 1916 |
| 1,258,643 | Beyer et al. | Mar. 12, 1918 |
| 1,315,360 | Blystad | Sept. 9, 1919 |
| 1,624,915 | Bennie | Apr. 19, 1927 |
| 2,032,532 | Eck | Mar. 3, 1936 |
| 2,316,272 | Meyer | Apr. 13, 1943 |